United States Patent [19]

Clatty et al.

[11] Patent Number: 5,137,788
[45] Date of Patent: Aug. 11, 1992

[54] THERMAL BREAK SYSTEMS

[75] Inventors: Jan L. R. Clatty, Monaca; Neil H. Nodelman, Pittsburgh; Robert M. Loring, Library; Michael F. Palmosina, II, Conway, all of Pa.

[73] Assignee: Miles Inc., Pittsburgh, Pa.

[21] Appl. No.: 410,211

[22] Filed: Sep. 21, 1989

[51] Int. Cl.$^5$ .............................................. B32B 15/08
[52] U.S. Cl. ................... 428/457; 252/182.25; 428/423.1; 525/443
[58] Field of Search .................. 428/457, 422.8, 423.1; 521/174, 106; 252/182.25; 528/77, 78; 525/443

[56] References Cited

U.S. PATENT DOCUMENTS

| | | | |
|---|---|---|---|
| 3,558,529 | 1/1971 | Whitman et al. | 521/174 |
| 3,945,939 | 3/1976 | Barron | 252/182.25 |
| 3,993,576 | 11/1976 | Barron | 252/182.25 |
| 4,141,852 | 2/1979 | Hogan et al. | 252/182.25 |
| 4,345,053 | 8/1982 | Rizk et al. | 525/443 X |
| 4,436,841 | 3/1984 | Rasshofer et al. | 521/106 |
| 4,575,518 | 3/1986 | Rasshofer et al. | 252/182.25 |
| 4,588,803 | 5/1986 | Christman | 528/78 |

*Primary Examiner*—Thomas J. Herbert, Jr.
*Attorney, Agent, or Firm*—Joseph C. Gil; Lyndanne M. Whalen

[57] ABSTRACT

Homogeneous storable mixtures containing small quantities of a potassium halide, having a high mixed hydroxyl number or mixed hydroxyl/amine number and an average functionality of at least 2.0 are made by mixing (a) a polyoxyalkylene polyol and/or polyolamine and/or polyamine based on an alkyloxirane having a molecular weight of from 400 to 12,000 and (b) a low molecular weight polyol which is not completely miscible with (a) wherein these mixtures are reacted with a prepolymer or a polyisocyanate to produce shrink stable thermal break urethanes having good adhesion to substrate properties and wherein the use of such mixtures increases processing flexibility without detrimentally affecting the physical properties of the thermal break urethanes produced.

10 Claims, 3 Drawing Sheets

THERMAL BREAK SYSTEMS

BACKGROUND OF THE INVENTION

The present invention relates to polyurethanes designed for thermal break (urethanes used as barriers to reduce transfer of thermal or electrical energy through metal are commercially known as thermal break systems) applications and to the mixtures of polyols and/or polyamines from which they are produced.

It is known that mixtures of polyols produce polyurethanes having improved thermal stability and impact strength. (See, e.g., U.S. Pat. No. 3,558,529). However, such polyols are generally incompatible enough that they do not form homogeneous mixtures. Use of such mixtures therefore presents storage and processing problems. For example, after brief storage periods (e.g. from a few hours to 3 days), even polyol systems which had been thoroughly mixed separate into two phases. Intensive remixing, continuous mixing or circulation would obviously prevent such separation but such measures are not commercially desirable.

A number of other techniques for promoting storage stability and homogeneity of mixtures of incompatible polyols and/or polyamines have been disclosed. Most of these techniques require the addition of a stabilizing material. For example, U.S. Pat. No. 3,945,939 teaches the addition of inert surface-active materials (such as silica agglomerate) to the disclosed polyol mixtures. U.S. Pat. No. 4,141,85> teaches addition of graft polypropylene ether glycols to polyol mixtures. U.S. Pat. No. 3,993,576 teaches that use of soluble diol compounds promotes homogeneity and storage stability. Conventional emulsifiers have also been used to stabilize mixtures of incompatible polyols. U.S. Pat. No. 4,436,841 discloses polyol mixtures to which ammonium or metal salts of $C_1$-$C_8$-monocarboxylic, polycarboxylic or hydrophilic acids have been added for stability.

U.S. Pat. No. 4,575,518 discloses homogeneous storage stable mixtures of polyols containing a small quantity of salt. The salts taught to be useful are composed of a cation from the 1st, 2nd or 3rd Main Group of the Periodic System of Elements or ammonium or mono- to tetra-alkylammonium ions and an anion which is a residue of the type formed by removing at least one proton from an acid having a $K_s$-value of at least $10^{-7}$. However, the polyol mixtures containing these salts which are disclosed in this patent produce a solid urethane which will not adhere to a substrate such as aluminum.

The ability of a polyurethane to adhere to a metal substrate is desired in thermal break applications. It would therefore be advantageous to use a homogeneous storage stable mixture of polyols to produce a polyurethane having improved mechanical properties which could be used in a thermal break system.

SUMMARY OF THE INVENTION

It is an object of the present invention to provide polyol components useful in thermal break urethane systems.

It is another object of this invention to provide improved thermal break systems by utilizing a NCO-prepolymer of a polyisocyanate and optimizing the % NCO or urethane content of this NCO-prepolymer to obtain optimum impact properties or reduced brittleness of the final urethane. The use of an NCO-prepolymer permits a wide latitude in processing while maintaining physical properties of the final urethane product.

These and other objects which will be apparent to those skilled in the art are accomplished by including a small quantity of a potassium halide in a mixture of (a) a polyoxyalkylene polyol and/or polyol amine and/or polyamine based on an alkyloxirane having a molecular weight of from 400 to 12,000 and (b) a polyol containing at least two hydroxyl groups having a molecular weight of from 62 to 399 which mixture is combined with a polyisocyanate and applied to a substrate to produce a thermal break urethane having improved shrinkage and adhesion characteristics. A key feature of the invention is the use of at least one compound within group (a) which has a functionality of at least about 3 in an amount such that the functionality of the total polyol mixture is at least about 3. In a preferred embodiment, the isocyanate employed is an NCO-prepolymer.

DETAILED DESCRIPTION OF THE INVENTION

Figure 1:
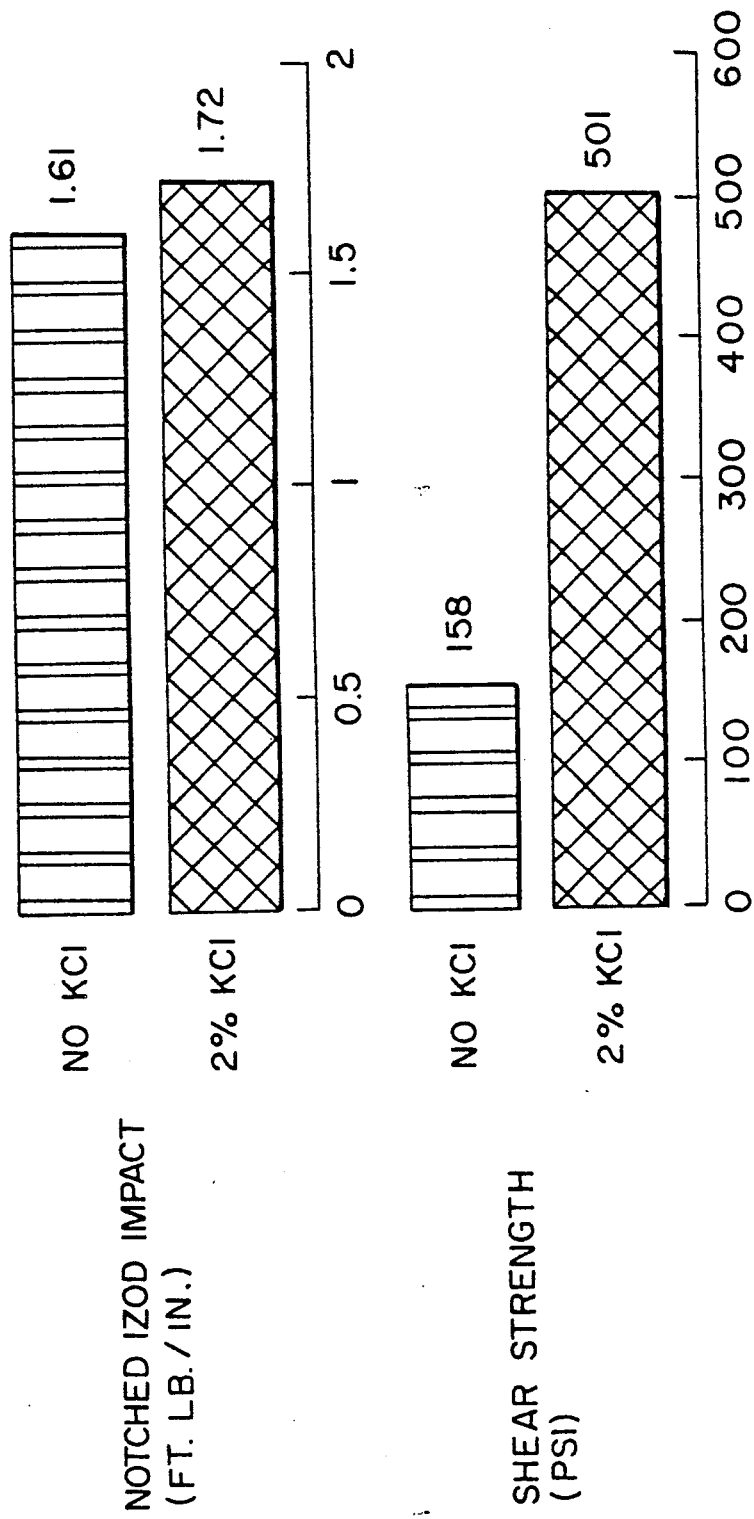
FIG. 1 is a graph illustrating a comparison of Notched Izod Impact and Shear Strength properties of urethanes made from two polyol systems which differed only with respect to the presence or absence of potassium chloride.

It has been found that a mixture of relatively high molecular weight oxyalkylene polyols, polyolamines, and/or polyamines having a molecular weight in the range from 400 to about 12,000 having a functionality or an average functionality of at least about 2.0 with low molecular weight polyols containing at least two hydroxyl groups and having a molecular weight in the range from 62 to 399 (preferably ethylene glycol and/or 1,4-butane diol) and a potassium halide give homogeneously storable mixtures which may be used to produce shrink stable urethanes having good adhesion properties with respect to metal substrates such as aluminum.

It has also been found that polyamines which are derived (formally) by partial or complete replacement of the hydroxyl groups of the polyols with primary and/or secondary amino groups or by —O—($CH_2$)$_3$—$NH_2$— or similar terminal groups containing amino groups formed by the terminal group modification of polyoxyalkylene polyols by known methods, or polyolamines in which only some of the OH-groups are replaced by the above-mentioned amino groups or residues containing amino groups which can also be made homogeneously storable and miscible with low molecular weight polyols (such as ethylene glycol and/or 1,4-butane diol) if a potassium halide, is added in an appropriate quantity may be used to produce solid urethanes having very good physical properties with improved adhesion to metal substrates.

By virtue of their high reactivity and their specific properties, the above-described polyols, polyolamines and polyamines are being used to an increasing extent in polyurethane systems. Simple mixtures of the polyoxyalkylene polyamines with low molecular weight polyols (such as ethylene glycol) do not, however, remain homogeneous. The present invention makes it possible to convert even polyoxyalkylene polyamines and low molecular weight polyols into homogeneous mixtures which are easier to use for the production of polyurethanes and/or polyureas.

The present invention relates to polyurethanes and/or polyureas made from homogeneously storable, potassium salt-containing, emulsifier-free mixtures having a high mixed hydroxyl number and a high content of low molecular weight polyols (molecular weight 62 to 399). The polyol mixtures employed are made up of relatively high molecular weight polyoxyalkylene polyols, low molecular weight polyols (molecular weight 32 to 399) containing at least two hydroxyl groups and solution promoting additives which are potassium halide salts. Other compounds containing isocyanate-reactive hydrogen atoms as well as auxiliaries and additives typically used in the production of polyurethanes and/or polyureas may also be included in this mixture. These mixtures have a mixed hydroxyl number and/or mixed hydroxyl/amine number of at least about 28, preferably from about 28 to about 700, most preferably from about 200 to about 400. The relatively high molecular weight polyoxyalkylene polyols, polyolamines and polyamines have a molecular weight of from 400 to 12,000, preferably from 800 to 10,000 and, most preferably, from 1000 to 8,000, are based on alkyloxiranes (preferably, propylene oxide) and preferably contain at least 5 wt. % and less than 80 wt. % (more preferably, from 10 to 50 wt. %) of oxyethylene segments. The polyolamines and polyamines are derived from polyoxyalkylene polyols in which from 0 to 100% of the hydroxyl groups are replaced by primary and/or secondary amino groups or —O—(CH$_2$)$_3$—NH$_2$—groups. The low molecular weight compounds (molecular weight 62 to 399) which contain at least two hydroxyl groups, preferably ethylene glycol and/or 1,4-butane diol, are not homogeneously storable to a sufficient extent if at all, in admixture with only the high molecular weight polyoxyalkylene polyol, polyolamine and/or polyamine. Other di- and/or polyfunctional compounds containing NCO-reactive hydrogen atoms and having a molecular weight of from 32 to 12,000, preferably aromatic polyamines may optionally be included in the mixture. The solution-promoting additive is one or more of the potassium halide salts.

For every 100 parts by weight of high molecular weight polyoxyalkylene polyol, polyolamine and/or polyamine in the mixture, from 1 to 35 parts by weight of low molecular weight compound containing at least two hydroxyl groups (preferably from 5 to 30 parts by weight and more preferably, from 10 to 25 parts by weight), from 0 to 40 parts by weight (preferably from 0.1 to 20 parts by weight) of other NCO-reactive compounds and from 0.05 to 33.3 parts by weight (preferably from 0.1 to 5 parts by weight) of potassium halide may be present. It is important that the functionality of this mixture be greater than 2, preferably greater than 2.5 and most preferably greater than 2.8.

The shrinkage, impact resistance and adhesion properties of thermal break polyurethanes made from these homogeneous polyol mixtures are better than those of polyurethanes made with known conventional polyol systems.

The high molecular weight polyols which may be used in the present invention include linear or branched, di-, tri-, tetra- or higher functional polyoxyalkylene polyols (polyalkylene oxide polyols) which have a molecular weight from 400 to 12,000, preferably from 800 to 10,000 and, more preferably, from 1000 to 8000. These polyols preferably have OH numbers of from 20 to 60. These polyoxyalkylene polyols may be obtained by the addition of alkyloxiranes, such as propylene oxide, epichlorohydrin, 1,2- or 2,3-butylene oxide and/or styrene oxide onto difunctional or higher starters, such as water, diols or polyols, ammonia, amines, di- or polyamines, aminoalcohols, hydrazine or similar compounds. Mixtures of alkyloxiranes (for example, of propylene oxide and epichlorohydrin) may also be used for producing the polyoxyalkylene polyols. It is preferred to use polyoxyalkylene polyols which contain at least 5 wt. % and less than 80 wt. % of polyoxyethylene segments and preferably at least some terminal primary hydroxyl groups. Polyoxyalkylene polyols or oxyethylene copolymers thereof which are based on propylene oxide optionally modified with oxyethylene segments are particularly preferred.

Polyoxyalkylene polyols which contain predominantly terminal oxyethylene blocks, preferably in quantities of from 10 to 50% by weight and, more preferably, in quantities of from 12.5 to 27.5% by weight, based on the sum of all the oxyalkylene units present in the polyoxyalkylene polyol are particularly suitable for the present invention. The remaining oxyalkylene radicals are preferably oxypropylene radicals. These polyoxyalkylene-oxyalkylene polyols are generally 2- to 8-functional and preferably di-, tri- or tetra- functional, most preferably di- to trifunctional polyoxyalkylene polyols. Technically the most important polyoxyalkylene polyols are the polyoxypropylene glycols which contain from 5 to 80% by weight, preferably from 10 to 50% by weight and, more preferably, from 12.5 to 27.5% by weight of predominantly terminal oxyethylene blocks and which have a functionality of from slightly greater than 2 to about 3.

Other preferred polyoxyalkylene polyether polyols (preferably diols or triols) are those which contain predominantly or exclusively internal oxyethylene blocks in quantities of 5%-80% by weight, preferably 10%-50% by weight, particularly 15%-35% by weight, and at the same time contain terminal oxyethylene units in quantities of 0%-15% by weight, preferably 0%-7.5% by weight in which the remaining oxyalkylene groups are oxypropylene groups.

Polyoxyalkylene polyether polyols containing oxyethylene radicals incorporated in random distribution are also preferred. The preferred range is 30%-75% by weight, particularly preferably 40%-60% by weight of ethylene oxide in addition to oxypropylene groups.

The polyalkylene polyether polyols can also be used in the form of a mixture.

In the preferred polyether polyols described above, the oxyethylene content should be such that at room temperature the polyether polyol is liquid or the non-oxyethylene content in the polyether polyol should be selected so that a liquid is obtained.

The polyoxyalkylene polyols may be produced in known manner by the polymerization of alkyloxiranes or mixtures thereof or by their addition onto starter components containing reactive hydrogen (such as water, ethylene glycol, 1,2- or 1,3-propane diol, dipropylene glycol, 1,4-3,6-dianhydrosorbitol, trimethylol propane, glycerol, pentaerythritol, sorbitol, sucrose, 4,4'-dihydroxydiphenyl propane, aniline, ethanolamine or ethylene diamine), optionally in the presence of acidic or, preferably basic catalysts. The polymerization process is optionally carried out in admixture with ethylene oxide, but preferably in stages with addition of the ethylene oxide in the final stage being preferred, or in stepwise reactions, in a manner such that the above-described polyols are formed. Some of the oxyethylene sequences or blocks may also be present within the polyethers, although for the most part they should be terminally arranged.

Production, properties and specific examples of polyethers of this type are described in Ullmanns Enzyklopadie der Technischen Chemie, Verlag Chemie, Weinheim, 4th Edition, Vol. 19 (1981), in the chapter on polyalkylene glycols (pages 31 to 38) and in the chapter on polyurethanes (pages 301 to 341, more particularly pages 304 to 308). They are also discussed in Kunststoff-Handbuch, Vol. VII, Polyurethane, Carl Hanser Verlag, Munich, 1st Edition (1966), pages 61 to 75, and 2nd Edition (1983), pages 42 to 54 and pages 75 to 77.

In another embodiment of the present invention, up to 100 wt. %, preferably from 10 to 50 wt. %, of all the hydroxyl groups in the polyoxyalkylene polyol compound(s) may be replaced by primary and/or secondary amino groups and/or by —O—(CH$_2$)$_3$—NH$_2$—groups. In this embodiment, it is preferred to use compounds of the type formed by the amination of polyalkylene glycol ethers, as described for example in BE-PS No. 634,741 or U.S. Pat. No. 3,654,370. It is also preferred to use compounds containing hydroxyl groups in polyoxyalkylene polyether polyamines of the type formed by the amination of the polyether polyols described above.

Other compounds containing amino groups, preferably in admixture with polyether polyols, suitable to the present invention are those obtained by the addition of acrylonitrile onto polyalkylene ethers, followed by the hydrogenation of the cyano groups (German Patent No. 1,193,671) and which mainly contain —O—(CH$_2$)—$_3$NH$_2$—groups. Other suitable aminopolyethers may be obtained by the processes disclosed in U.S. Pat. Nos. 3,625,871, 3,155,728 and 3,236,895, French Patents 1,551,605, 1,466,708, German Offenlegungsschriften 2,109,432 and 2,619,840, U.S. Pat. Nos. 3,808,250, 3,975,428 and 4,016,143, German Offenlegungsschriften 2,748,419 and 3,039,600 and European Patent 71,834.

These amino-group-containing polyethers have molecular weights, functionalities, propylene oxide and ethylene oxide contents and the terminal or non-terminal distribution thereof within the same ranges as the high molecular weight polyols described above. In cases where compounds containing amino groups are used, it is preferred to use a mixture of the type obtained by the partial amination (preferably 10 to 50%) of the compounds containing primary hydroxyl groups or a mixture of those compounds.

Compounds containing at least two hydroxyl groups and having a molecular weight of from 62 to 399 and preferably from 62 to 254 may be used as the low molecular weight polyol. These polyols show little, if any, miscibility in the high molecular weight polyoxyalkylene polyols in the absence of some type of compatibility promoting material such as the potassium halides required in the present invention.

Appropriate low molecular weight polyols include: diols or mixtures of diols, preferably straight-chain or branched-chain (cyclo)alkylene diols, such as ethylene glycol, 1,2-propane diol, 1,3-propane diol, 3-chloro, 2-propane diol, 1,4-butane diol, 1,4-dihydroxy cyclohexane, 1,4-dihydroxy methyl cyclohexane, 2-butene-1,4-diol; (cyclo)aliphatic triols, such as glycerol, trimethylol ethane, 1,2,6-hexane triol, trimethylol propane or 1,2,4-butane triol and the propoxylation and ethoxylation products of these triols with molecular weights of up to 399; polyols, such as bis- and tris-tri-methylol propane, pentaerythritol and their mono- and oligoethoxylation products; also the bis-propoxylation or bis-ethoxylation products of aromatic phenols, preferably bis-(4-hydroxyphenyl)-dimethyl methane or hydroquinone. Formoses and formitols having molecular weights of up to 399 are also suitable. Ethylene glycol and/or 1,4-butane diol are preferred. However, ethylene glycol is the most preferred.

Isocyanate-reactive compounds other than those described above which may optionally be included in the mixtures of the present invention include compounds containing at least two isocyanate-reactive hydrogen atoms and having a molecular weight of from 32 to 12,000. These compounds include both relatively high molecular weight compounds containing amino groups, thiol groups, hydrazide groups or carboxyl groups but preferably hydroxyl groups having a molecular weight of from 400 to 12,000 and preferably from 1000 to 8000 (for example, polyesters, polythioethers, polyacetals, polycarbonates and polyester amides and also polyoxytetramethylene polyols containing at least 2, generally 2 to 8, but preferably 2 to 3 hydroxyl groups) known to be useful in the production of solid and cellular polyurethanes, and also relatively low molecular weight, di- and/or polyfunctional compounds having molecular weights of from 32 to 399 (preferably from 62 to 254) and/or water (e.g. the crosslinking agents or chain-extending agents generally known in polyurethane chemistry).

Suitable relatively high molecular weight compounds which may optionally be included in the mixtures of the present invention include polyesters containing hydroxyl groups, i.e. reaction products of polyhydric, preferably dihydric and, optionally, also trihydric alcohols (or mixtures thereof) with polybasic, preferably dibasic carboxylic acids, carboxylic acid esters or carboxylic acid anhydrides. Polyesters of lactones or hydroxy carboxylic acids, for example caprolactone or -hydroxycaproic acid, may also be used. OH—, NH— and/or SH-group-containing polybutadienes, polythioethers, polyacetals, OH-group-containing polycarbonates, polyester amides, polyether polyols substantially free from ethylene oxide and/or propylene oxide units (for example, polytetramethylene oxide diols) and aminofunctional polyamides may also be used.

Polyhydroxyl compounds already containing urethane or urea groups and optionally modified natural polyols such as tall oil or carbohydrates such as starch, may also be included. Adducts of alkylene oxides with phenolformaldehyde resins or even with urea-formaldehyde resins may also be used. Solutions of polyisocyanate polyaddition products, particularly solutions of polyurethane ureas containing ionic groups and/or solutions of polyhydrazodicarbonamides, in low molecular weight polyhydric alcohols (German Offenlegungsschrift 2,638,759) may also be used as optional isocyanate-reactive materials. Polyhydroxyl compounds of the polyamino compounds (polyether amines), in which high molecular weight polyadducts or polycondensates or polymers are present in finely dispersed or dissolved form, may also optionally be used.

Polyhydroxy or polyamino compounds such as these may be obtained, for example, by carrying out polyaddition reactions (for example reactions between polyisocyanates and aminofunctional compounds) or polycondensation reactions (for example between formaldehyde and phenols and/or amines) in situ in the above-mentioned compounds containing hydroxyl groups. Processes such as these are described, for example, in German Auslegeschriften 1,168,075 and 1,260,142 and in German Offenlegungsschriften 2,324,134, 2,423,984, 2,612,385, 2,513,815, 2,550,796, 2,550,797, 2,550,883, 2,550,862, 2,633,293 and 2,639,253. However, it is even possible, in accordance with U.S. Pat. No. 3,869,413 or German Offenlegungsschrift 2,550,860, to mix a prepared aqueous polymer dispersion with a polyhydroxyl compound and subsequently to remove the water from the mixture. The production of polymer containing polyether amines is described in U.S. Pat. No. 4,286,074 and in German Offenlegungsschriften 3,112,118 and 3,200,021.

Polyhydroxyl compounds modified by vinyl polymers, obtained for example by polymerizing styrene and acrylonitrile in the presence of polyethers (U.S. Pat. Nos. 3,383,351; 3,304,273; 3,523,093 and 3,110,695; or polycarbonate polyols, U.S. Pat. No. 3,637,909), may also be used as an optional component in the mixtures of the present invention. Polyether polyols which have been modified in accordance with German Offenlegungsschriften 2,442,101, 2,644,922 and 2,646,141 by graft polymerization with vinyl phosphonic acid esters and, optionally, (meth) acrylonitrile, (meth)acrylamide or OH-functional (meth) acrylic acid esters are particularly useful in the production of flame resistant plastics.

Modified polyhydroxyl compounds of the type mentioned above may be used as a starting component in the polyisocyanate polyaddition process to produce polyurethanes having considerably improved mechanical properties.

Relatively high molecular weight, di- or polyfunctional polyamino compounds may also be used advantageously as an optional isocyanate-reactive component in the mixtures of the present invention. The reaction of NCO-prepolymers with enamines, aldimines or ketimines containing hydroxyl groups, followed by hydrolysis (U.S. Pat. No. 3,865,791), gives relatively high molecular weight compounds containing terminal amino groups. Other processes for producing relatively high molecular weight compounds containing terminal amino groups or hydrazine groups are described in U.S. Pat. No. 3,625,871. In these compounds, the terminal residues containing the amino groups may even be attached to the polyether chain through urethane or ester groups. "Aminopolyethers" may also be produced by reacting polyhdyroxyl polyethers of relatively high molecular weight with isatoic acid anhydride to form the corresponding anthranilic acid esters and polyethers containing terminal aromatic amino groups. Other amino polyethers having molecular weights of from 400 to 12,000 produced by alkaline NCO-hydrolysis may also be used as an optional isocyanate-reactive component of the mixtures of the present invention.

Other suitable optional isocyanate-reactive components are relatively low molecular weight compounds containing at least two isocyanate-reactive hydrogen atoms and having a molecular weight of from 32 to 399. These compounds contain hydroxyl groups and/or amino groups and/or thiol groups and/or carboxyl groups and/or —$CH_2$—$NH_2$—$NH_2$—-group and preferably contain hydroxyl groups and/or (aromatic) amino groups. Many of these compounds are known as chain extending agents or crosslinking agents for polyurethanes. These compounds generally contain from 2 to 8 and preferably from 2 to 4 reactive, especially isocyanate-reactive, hydrogen atoms. These low molecular weight compounds may even be used in the form of mixtures or in admixture with optional relatively high molecular weight compounds.

For certain applications, it is of advantage to use polyols containing sulfonate and/or phosphonate groups, preferably the adduct of bisulfite with 1,4-butane diol or alkoxylation products thereof.

Optional isocyanate-reactive components may be selected from low molecular weight aliphatic polyamines such as ethylene diamine, 1,4-tetramethylene diamine, 1,11-undecamethylene diamine, 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane; p-xylylene diamine; bis-(3-aminopropyl)-methylamine; diaminoperhydroanthracenes and cycloaliphatic triamines (German Offenlegungsschrift 2,614,244).

In accordance with the present invention, it is also possible to use hydrazine and substituted hydrazines such as methyl hydrazine, N,N'-dimethyl hydrazine and homologs thereof; acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazidoalkylene hydrazides such as β-semicarbazido-propionic acid hydrazide; semi-carbazido-alkylene carbazinic esters such as 2-semicarbazidoethyl-carbazinic ester or even aminosemicarbazido-carbonate. To control their reactivity, the amino groups may be completely or partly blocked by aldimine or ketimine groups.

Examples of aromatic diamines preferably used include: bis-anthranilic acid esters (German Offenlegungsschriften 2,040,644 and 2,160,590); 3,5- and 2,4-diaminobenzoic acid esters (German Offenlegungsschriften 2,025,900); the diamines containing ester groups described in U.S. Pat. Nos. 3,681,290 and 3,736,350; diamines containing ether groups (U.S. Pat. Nos. 3,654,364 and 3,736,295); 2-halogen-1,3-phenylene diamines optionally substituted in the 5-position; 3,3'-dichloro-4,4'-diaminodiphenylmethane; tolylene diamine, 4,4'-diaminodiphenylmethane; 4,4'-diaminodiphenylsulfides; diaminodiphenyldisulfides; aromatic diamines substituted by alkylthio groups; diaminobenzene phosphoric acid esters and the alkyl-substituted tolylene diamines (for example, 2,4-/2,6-diamino-3,5-diethyltoluenes); diaminotriethyl benzenes and amines disclosed in European Patent Applications Nos. 82,258 and 69,2B6. It is preferred to use aromatic diamines such as 2,4-/2,6-diamino-3,5-diethyltoluenes in the mixtures of the present invention because they yield polyurethane moldings with particularly favorable properties.

As is standard practice in polyurethane chemistry, monofunctional compounds may be used in small, modifying quantities of from about 0.01 to 3 wt. % based on polyurethane solids, as so-called chain terminators in the formation of the polyurethanes.

Examples of compounds suitable as optional isocyanate-reactive components are described, for example, in High Polymers, Vol. XVI, "Polyurethanes, Chemistry and Technology" by Saunders-Frisch, Interscience Publishers, New York/London, Vol. I, 1962, pages 32–42 and pages 44–54 and Vol. II, 1964, pages 5–6 and 198–199, and in Kunststoff-Handbuch, Vol. VII, Vieweg-Hochtlen, Carl Hanser Verlag, Munich, 1966, for example on pages 45–71.

It is of course possible to use mixtures of the abovementioned compounds containing at least two isocyanate-reactive hydrogen atoms, for example mixtures of polyethers and polyesters or mixtures of polyesters and low molecular weight polyols.

The solubility-promoting component used in accordance with the present invention is selected from potassium halide salts preferably potassium chloride and potassium bromide.

The potassium salt is generally used in a quantity such that there are from 0.005 to 33.3 parts of salt, preferably from 1.23 to 4.76 parts, most preferably, from 1.96 to 3.38 parts of salt for every 100 parts of high molecular weight polyoxy-alkylene polyol and/or polyamine. Where the salt used is relatively difficult to dissolve (i.e. where less than 10 parts of salt- dissolve in the low molecular weight polyol), the quantity dissolved preferably corresponds to the maximum solubility of the particular salt.

The necessary quantity of solution-promoting potassium salt depends upon the quantity of oxyethylene groups in the polyether and also upon the type and quantity of diols added. In general, the lower the oxyethylene content and the higher the content of added diols, the more solution-promoting salt will be required.

In general, the potassium solution-promoting salt is dissolved in the low molecular weight polyol component optionally with heating. The resulting solution is then combined with the high molecular weight polyoxyalkylene component and with other optional components. The solution promoting additive must be highly soluble even in admixture with the high molecular weight polyoxyalkylene component. It is also possible to add solid, solution-promoting potassium halide, optionally with stirring to a two-phase mixture of the high and low molecular weight components of the mixtures of the present invention. A concentrated solution of solution-promoting potassium salt in low molecular weight polyol may also be added to a two-phase mixture of the high and low molecular weight components. Inclusion of optional components should not affect the homogeneity of the mixture of the polyoxyalkylene and low molecular weight polyol components.

The potassium salt used as solution-promoting additive is added to the polyoxyalkylene polyols or polyamines and to the low molecular weight polyols particularly when the low molecular weight polyol is immiscible with the polyoxyalkylene polyol and/or polyamine or when the selected quantity of low molecular weight polyol is not completely miscible with the polyoxy-alkylene polyol and/or polyamine.

Among the standard auxiliaries and additives which may be included in the mixtures of the present invention are known catalysts such as tertiary amines (e.g. dimethyl benzylamine, 1,4-diazabicyclo-(2,2,2) octane or triethanolamine), monocyclic or bicyclic amidines, bis-dialkylaminoalkyl ethers or tertiary amines containing amide groups. Basic catalysts, such as alkali hydroxides, alkali phenolates or alkali alcoholates, and organometallic compounds, particularly organic lead and tin compounds (for example, tin-(II) octoate, tin-(II) laurate, dibutyl tin dilaurate) or mixtures thereof, may also be used.

It is also possible to add known reaction retarders for the isocyanate reaction (for example, substances showing an acidic reaction, such as hydrochloric acid or organic acid halides, boric acid or sulfur dioxide), known cell regulators for foams, such as paraffins or fatty alcohols, or even dimethyl polysiloxanes as well as known pigments, dyes, flameproofing agents, defoamers, stabilizers against the effects of light, aging and weather, plasticizers and fungistatic and bacteriostatic agents. Additional examples of such optional additives are described in Kunststoff-Handbuch, Vol. 7, by Vieweg and Hochtlen, Carl Hanser Verlag, Munich, 1966, on pages 96 to 113. Blowing agents for the production of polyurethane foams are described on pages 453 to 455 and 507 to 510. These additives are also disclosed in the 2nd Edition of this handbook, Vol. 7, (1983), pages 92 to 112.

Isocyanate-inert polymers or copolymers of olefinically unsaturated monomers having a molecular weight determinable by vapor pressure osmometry of from 200 to 50,000, preferably from 200 to 30,000 and, more preferably, from 5000 to 15,000 (German Offenlegungsschrift No. 3,231,399) compatible with the reaction mixture may be used as surface-improving additives. The polymers or copolymers generally have a viscosity of from 1 to 1000 Pa.s at 100° C. The polymers or copolymers are preferably those in which from 50 to 100 parts by weight are at least one $C_1$-$C_{18}$-alkyl ester, preferably $C_1$-$C_{10}$-alkyl ester, of acrylic or methacrylic acid and from 0 to 50 parts by weight are other isocyanate-inert, olefinically unsaturated monomers. In principle, it is also possible to use polymers completely or partly free from acrylates or methacrylates, such as polystyrenes or styrene copolymers.

Polyol mixtures containing potassium halide may be used as the sole reaction component containing OH groups or in combination with other OH group containing materials together with polyisocyanates, the optional isocyanate-reactive compounds and other optional auxiliaries and additives, such as catalysts, colorants, fillers and/or fibers to produce polyurethanes.

In addition to the potassium halide containing polyol mixture, other relatively high molecular weight polyols having molecular weights of, for example, from 400 to 12,000 and preferably from 450 to 6000 in the form of the polyesters, polylactones, polycarbonates, polyoxytetramethylene ethers, polythioethers, polyesters, polyacetals and vinyl polymers containing preferably 2 or even more active hydrogen atoms (essentially hydroxyl groups) known to those skilled in the art of polyurethane chemistry may be used to produce polyurethanes in accordance with the present invention.

Appropriate polyisocyanates which may be reacted with the above-described systems to produce polyurethane thermal break systems in accordance with the present invention include those commonly used for the production of polyurethane thermal break systems such as diphenylmethane-4,4'- and/or -2,4'-and/or -2,2'-diisocyanate (MDI); and the technical polyphenyl-polymethylene polyisocyanates obtained by phosgenating aniline-formaldehyde condensates and described, for example, in British Patent No. 874,430 and 848,671 (MDI containing polynuclear polyisocyanates). The modified polyisocyanates obtained by the modification of MDI, for example polyisocyanates modified with polyols through urethane groups, carbodiimide polyisocyanates, isocyanurate polyisocyanates, biuretized polyisocyanates, allophanitized polyisocyanates or uretdione polyisocyanates are examples of suitable modified technical isocyanates.

In a preferred embodiment of the invention, the polyisocyanate used is an NCO-prepolymer of a polyisocyanate such as those described above and an isocyanate reactive compound such as the relatively high molecular weight polyols described above. Preferred prepolymers are formed by reacting MDI with a high molecular weight polyol in quantities such that the NCO content is from about 22 to 30%.

Figure 3:
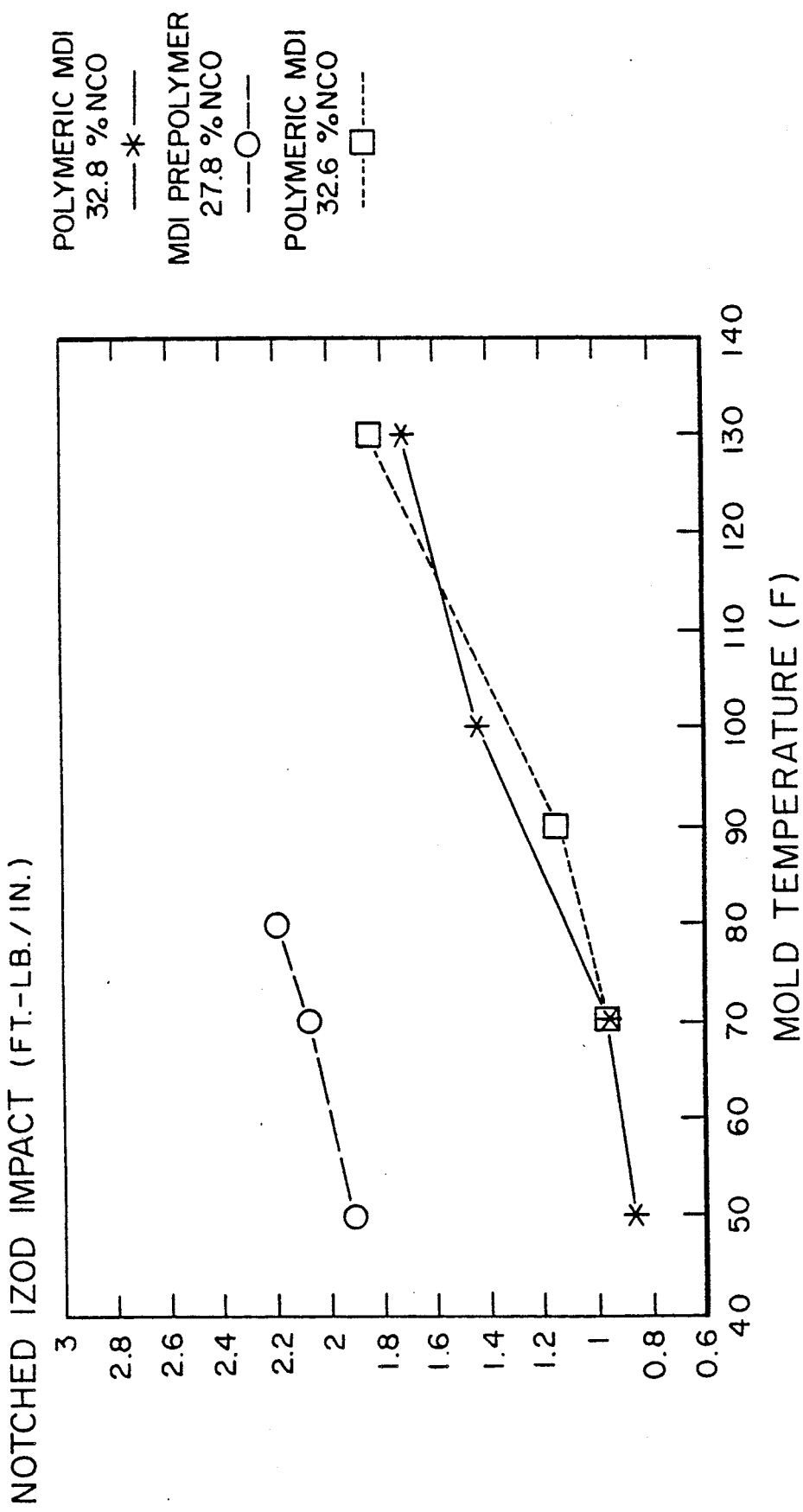
FIG. 3 is a graph illustrating the relationship between Notched Izod Impact and mold temperature for urethanes made from a polyol mixture within the scope of the present invention and (1) polymeric MDI and (2) an MDI prepolymer.

As can be readily appreciated from FIG. 3, the impact strength of urethanes made from a prepolymer is substantially better than that of urethanes made from an isocyanate.

Figure 2:
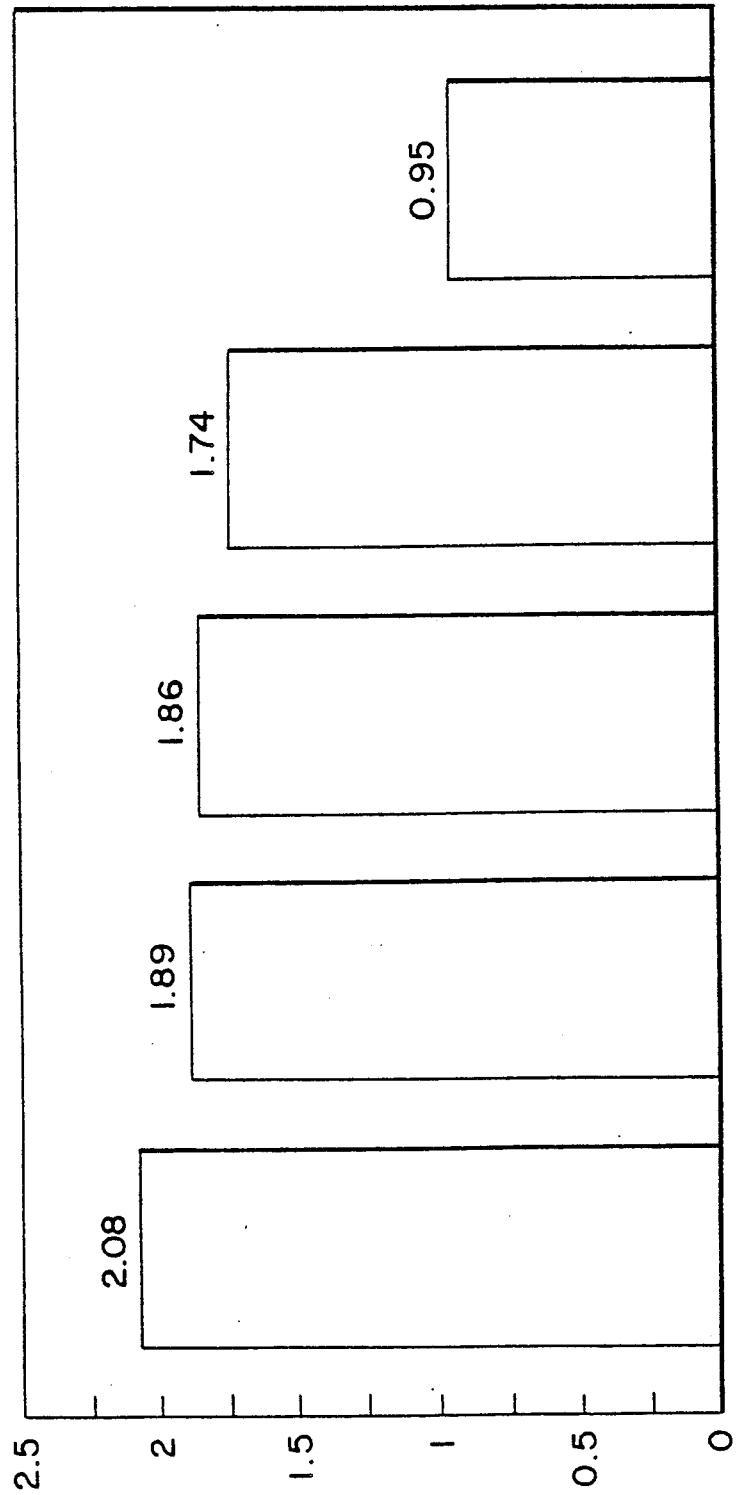
FIG. 2 is a graph illustrating the relationship between Notched Izod Impact and isocyanate group content of a prepolymer reacted with a polyol system in accordance with the present invention.

It has also been found that use of an NCO-prepolymer makes it possible to optimize the impact and brittleness properties because the NCO content of a prepolymer may be adjusted (See FIG. 2).

Auxiliaries and additives may be introduced either separately or in admixture with one of the reaction components, such as (additional) relatively high molecular weight polyhydroxyl compounds, polyisocyanates or NCO-prepolymers, blowing agents, solvents and the like. Such auxiliaries and additives include for example, catalysts, reaction retarders, blowing agents, cell regulators, emulsifiers, polysiloxanes, fillers, dyes, pigments, oxidation inhibitors, UV-absorbers, light stabilizers, stabilizers against oxides of nitrogen, flameproofing agents and, optionally, small quantities of monofunctional chain terminators.

The processing of the mixtures of the present invention together with the other polyurethane-forming reactants may be carried out by any of the processes known to those skilled in the art. For example, multistage processes (NCO-prepolymer formation and subsequent reaction) or one-shot processes may be used. Processing is mainly carried out by means of metering, mixing and/or discharge units or in molds of the type normally used for processing polyurethanes (see for example Ullmanns Enzyklopadie der Technischen Chemie, Verlag Chemie Weinheim, 4th Edition, Vol. 19, Keyword "Polyurethanes", pages 314 to 336, and in Kunststoff-Handbuch, Vol. 7, "Polyurethane", Hanser-Verlag, 2nd Edition, 1983; more particularly to Chapter 4 (Processes for Producing Polyurethanes, pages 121 to 169); Chapter 5 (Flexible PUR Foams, pages 170 to 245); Chapter 6 (Rigid PUR Foams, pages 246 to 332) and Chapter 7 (Integral PUR Foams, pages 333 to 390)).

The homogeneous isocyanate reactive mixture of the present invention may be continuously introduced into a mixing chamber or a mixing vessel in which the other polyurethane-forming components (for example other compounds containing reactive H-atoms, optionally in admixture with additives or auxiliaries) are mixed in through separate metering units. The polyisocyanates or NCO prepolymers are generally added through separate pipes. The technical procedure of metering, mixing, simultaneous or step-by-step introduction of components may be modified in various ways in accordance with techniques and procedures known to those in the art. The introduction of the homogeneous mixture of the present invention produces a more uniform reaction and, in general, formation of polyurethane (urea)s having better properties than those obtained with non-homogeneous mixtures.

In one embodiment of the present invention, different mixtures may be combined to form the mixtures of the present invention. More specifically, a mixture of polyoxyalkylene polyol and/or polyamine, low molecular weight polyol and potassium halide salt having a high concentration of low molecular weight polyol and/or solution-promoting additive may be added to another mixture having a high polyoxyalkylene polyol and/or polyamine and mixed to provide a final mixture which satisfies the composition requirements of the present invention.

The mixtures of the present invention are particularly useful in the production of thermal break urethanes. More specifically, the improved adhesion to substrates, particularly metal substrates such as aluminum and stability against shrinkage achieved make them particularly advantageous in the production of insulated doors and windows for residential and industrial environments, etc. Appropriate substrates and techniques for applying urethanes to such substrates (e.g. aluminum and steel) to obtain such insulated doors and windows, etc. are known to those skilled in the art.

Polyurethanes produced by reacting the polyol mixtures of the present invention with an NCO-prepolymer are also characterized by reduced brittleness.

Having thus described our invention, the following examples are given as being illustrative thereof. All parts and percentages given in these Examples are parts by weight and percentages by weight unless otherwise indicated.

EXAMPLES

The following materials were used in the Examples given below:

POLYOL A: A polyol formed by adding propylene oxide and ethylene oxide (PO:EO=80:20) to propylene glycol having an OH number of 28 and a molecular weight of 4007 having a functionality of 2.

POLYOL B: A glycerine initiated polyol to which a mixture of propylene oxide and ethylene oxide (PO:EO=87:13) was added having a molecular weight of 4809, an OH number of 35 and a functionality of 3.

POLYOL C: An ethylene diamine initiated propylene oxide having an OH number of 630, a molecular weight of 356 and a functionality of 4.

POLYOL D: A propoxylated monoethanol amine having an OH number of 355, a molecular weight of 474 and a functionality of 3.

POLYOL E: A glycerine initiated propoxylated/ethoxylated (PO:EO =87:13) polyol having an OH number of 28, a molecular weight of 6011 and a functionality of 3.

EG: Ethylene glycol.

DB: N,N-dimethylbenzylamine.

DABCO-DCI: A glycolic acid salt of triethylenediamine in diethylene glycol.

DABCO-WT: 1-(2'-hydroxypropyl)imidazole.

PC 8: N,N-dimethyl cyclohexylamine.

33LV
: A 33% triethylene diamine and 67% dipropylene glycol chain extender.

T12: Dibutyltindilaurate.

Polyisocyanate A: 78% monomeric MDI and 22% polymeric MDI having an NCO content of 32.8%.

Polyisocyanate B: 60% monomeric MDI and 40% polymeric MDI having an NCO content of 32.6%. having an NCO content of 32.0%

Prepolymer A: A prepolymer formed by reacting Polyisocyanate B with Polyol E in an NCO:OH weight ratio of 90:10 having an NCO content of 28.6%.

Prepolymer B: A prepolymer formed by reacting Polyisocyanate B with Polyol E in an NCO:OH weight ratio of 92:8 having an NCO content of 29.3%.

Prepolymer C: A prepolymer formed by reacting Polyisocyanate B with Polyol E in an NCO:OH weight ratio of 94:6 having an NCO content of 30.0%.

Prepolymer D: A prepolymer formed by reacting Polyisocyanate B with Polyol E in an NCO:OH weight ratio of 86:14 having an NCO content of 27.8%.

EXAMPLE 1

Solutions of either potassium chloride or potassium bromide in ethylene glycol were made by heating a mixture thereof to the temperature indicated in Table 1 and mixing for the time given in Table 1 to verify the solubility concentrations of the potassium halide salts in ethylene glycol (as recommended in U.S. Pat. No. 4,575,518).

TABLE 1

| | Salt Solution | | | | | | | | |
|---|---|---|---|---|---|---|---|---|---|
| | A | B | C | D | E | F | G | H | I |
| wt. % K Cl | 0.005 | 1.23 | 4.76 | 11.1 | — | — | — | — | — |
| wt. % K Br | — | — | — | — | 0.005 | 1.23 | 4.76 | 11.1 | 33.3 |
| Temp (°C.) | 70 | 70 | 70 | 85 | 70 | 70 | 70 | 70 | 90 |
| Mixing time (min) | 15 | 15 | 15 | 80 | 15 | 15 | 15 | 68 | 60 |
| Solubility | soluble | soluble | soluble | not totally soluble | soluble | soluble | soluble | soluble | not totally soluble |

EXAMPLE 2

Polyol components for polyurethane-forming systems were made with the salt solutions described in Table 1 to check phase stability of the final blended resin and to further define the salt level at which a phase stable system could be maintained. The composition of each of these Polyol Components is given in Table 2.

TABLE 2

| | Polyol Component | | | | | | |
|---|---|---|---|---|---|---|---|
| | I | II | III | IV | V | VI | VII |
| Polyol A (pbw) | 30 | 30 | 30 | 30 | 30 | 30 | 30 |
| Polyol B (pbw) | 35 | 35 | 35 | 35 | 35 | 35 | 35 |
| Polyol C (pbw) | 7 | 7 | 7 | 7 | 7 | 7 | 7 |
| Polyol D (pbw) | 8 | 8 | 8 | 8 | 8 | 8 | 8 |
| DB (pbw) | 1.5 | 1.5 | 1.5 | 1.5 | 1.5 | 1.5 | 1.5 |
| 33 LV | 0.15 | 0.15 | 0.15 | 0.15 | 0.15 | 0.15 | 0.15 |
| Salt solution (#/pbw) | A/20 | B/20 | C/20 | E/20 | F/20 | G/20 | H/20 |
| Phase stability | Unstable | Unstable | Stable | Unstable | Stable | Stable | Stable |

EXAMPLES 3–9

Each of the polyol blends described in Table 2 were reacted with Polyisocyanate B and Prepolymer A at the mix ratio indicated. The reaction mixture was poured into a mold at 70° F. and allowed to remain there for 4 minutes. The samples were prepared for shear strength analysis by the test method described below. Also, ¼" notched Izod samples were prepared for impact testing. The results are summarized in Table 3.

The impact properties of the urethanes made with the polyol systems of the present invention and an MDI prepolymer were better than those obtained using the same polyol system and a polymeric MDI. The properties also appeared to improve with increasing concentration of potassium salt. Good adhesion was achieved with all of the systems tested.

A test method was developed to define changes in shear strength or urethane-to-substrate bonding. The procedure is described below. All shear strength results in future examples refer to this test method.

SHEAR STRENGTH TEST

First, four 1"×3"×0.041" aluminum strips were lightly cleaned with steel wool and rinsed with methylene chloride and then degreased in trichloroethane. Aluminum strips were then placed in an insert so that only a 1"×1" surface would be exposed to the urethane being poured into the mold. The aluminum was secured by the closing of the mold. Once the panel was demolded, the sample was cut to 5 inches in length with a urethane to aluminum center 1"×1"×0.291" in dimension. This allowed for a 2" tab of aluminum or urethane on either side of the bond. Any mechanical bonds were broken prior to testing. Samples were then evaluated similarly to a tensile test (ASTM Designation : D 638-72). Final results are reported in pounds per square inch.

TABLE 3

| Example # | Polyol Component (100 pbw) | Polyisocyanate B (pbw) | Prepolymer A (pbw) | Shear Strength (psi) | Izod (ft.lb/in) |
|---|---|---|---|---|---|
| 3a | I | 108 | — | 147 | 1.70 |
| 3b | I | — | 123 | 112 | 2.15 |
| 4a | II | 108 | — | 143 | 2.10 |
| 4b | II | — | 123 | 181 | 2.45 |
| 5a | III | 106 | — | 240 | 2.27 |
| 5b | III | — | 118 | 191 | 2.5 |

TABLE 3-continued

| Example # | Polyol Component (100 pbw) | Polyisocyanate B (pbw) | Prepolymer A (pbw) | Shear Strength (psi) | Izod (ft.lb/in) |
|---|---|---|---|---|---|
| 6a | IV | 108 | — | 171 | 1.10 |
| 6b | IV | — | 123 | 116 | 1.75 |
| 7a | V | 108 | — | 192 | 1.90 |
| 7b | V | — | 123 | 98 | 1.94 |
| 8a | VI | 106 | — | 211 | 2.08 |
| 8b | VI | — | 118 | 206 | 2.20 |
| 9a | VII | 106 | — | 208 | 1.87 |
| 9b | VII | — | 121 | 155 | 2.28 |

COMPARISON EXAMPLE 1

The polyol mixture described in Example 5.4 of U.S. Pat. No. 4,575,518 was evaluated by reacting it with Polyisocyanate B to form panels which were tested for shear strength. More specifically, a polyol component was formed from 100 parts by weight of Polyol A, 9.5 parts by weight of EG, 0.5 parts by weight of potassium chloride and 0.02 parts by weight of T12. This phase stable polyol component was reacted with 49.1 parts by weight Polyisocyanate B at an index of 1.05 in a mold maintained at 70° F. for 15 minutes. The resultant elastomeric material was characterized by an average shear strength of 36.5 psi. This material did not adhere well to an aluminum substrate.

EXAMPLE 10

Samples were prepared with each of the reaction mixtures described in Table 4 (catalyst levels were adjusted so reactivities were comparable) for notched Izod impact and shear strength comparison. A ¼" aluminum mold at 130° F. and a demold time of approximately 4 minutes was used to prepare the samples. Polyol mixture VIII was clear and one phase; polyol mixture IX was not. Samples made with mixture IX did not adhere to an aluminum substrate. FIG. 1 illustrates a comparison of the impact properties of samples made from Polyol mixture VIII (with KCl) and from Polyol mixture IX (without KCl).

TABLE 4

| Mixture | VIII | IX |
|---|---|---|
| Polyol A (pbw) | 30 | 30 |
| Polyol B (pbw) | 35 | 35 |
| Polyol C (pbw) | 15 | 15 |
| EG (pbw) | 19.5 | 20 |
| DEG (pbw) | — | — |
| DPG (pbw) | — | — |
| KCl (pbw) | 0.5 | — |
| PC8 (pbw) | 0.2 | 0.5 |
| T12 (pbw) | — | — |
| Polyisocyanate A (pbw) | 112 | 114 |
| Polyisocyanate C (pbw) | — | — |
| Index | 105 | 105 |
| Notched Izod (ft-lb/in) | 1.72 | 1.61 |
| Shear strength (psi) | 501 | 158 |

EXAMPLE 11

Five different systems were made from the components listed in Table 5 in the indicated quantities. It is apparent from these results that increasing urethane content causes an increase in impact properties. This test would be most closely related to measuring brittleness properties of the urethane. FIG. 2 illustrates these results.

TABLE 5

| | SYSTEM | | | | |
|---|---|---|---|---|---|
| | X | XI | XII | XIII | XIV |
| POLYOL A (pbw) | 30 | 30 | 30 | 30 | 30 |
| POLYOL B (pbw) | 35 | 35 | 35 | 35 | 35 |
| POLYOL C (pbw) | 15 | 15 | 15 | 15 | 15 |
| EG (pbw) | 20 | 20 | 20 | 20 | 20 |
| KCl (pbw) | 0.5 | 0.5 | 0.5 | 0.5 | 0.5 |
| 33LV (pbw) | 0.15 | 0.15 | 0.15 | 0.15 | 0.15 |
| DB (pbw) | 1.5 | 1.5 | 1.5 | 1.5 | 1.5 |
| PREPOLYMER D (pbw) | 130 | — | — | — | — |
| PREPOLYMER A (pbw) | — | 128 | — | — | — |
| PREPOLYMER B (pbw) | — | — | 125 | — | — |
| PREPOLYMER C (pbw) | — | — | — | 122 | — |
| POLYISOCYANATE B (pbw) | — | — | — | — | 113 |
| INDEX | 105 | 105 | 105 | 105 | 105 |
| DENSITY (pcf) | 73.2 | 73.0 | 73.6 | 74.0 | 70.1 |
| HDT @ 66 psi (°C.) | 70.7 | 72.1 | 71.1 | 83.6 | 85.7 |
| IZOD (ft-lb/in) | 2.08 | 1.89 | 1.86 | 1.74 | 0.95 |
| FLEX MODULUS (psi) | 177,500 | 205,695 | 211,600 | 228,755 | 250,10 |
| FLEX STRENGTH (psi) | 6916 | 8148 | 8510 | 9007 | 9930 |
| TENS. STRENGTH (psi) | 4743 | 5360 | 5669 | 5972 | 5289 |
| ELONGATION (%) | 5 | 25 | 15 | 17 | 10 |
| GEL TIME (sec) | 28 | 23 | 24 | 24 | 41 |
| MOLD TEMPERATURE (°F.) | 70 | 70 | 70 | 70 | 70 |

EXAMPLE 12

Three systems were made from the components listed in Table 6 in the indicated quantities. Results illustrate the effect of mold temperature vs. impact or brittleness properties. Polyurethanes made with the MDI prepolymer in a mold heated at temperatures ranging from 50 to 130° F. had better impact properties than the corresponding polyurethanes made with the polymeric MDI at the same temperatures. This relationship between mold temperature and the isocyanate employed is illustrated in FIG. 3. The relationship between mold temperature and adhesion property appears to be similar. That is, adhesion gets better as the mold temperature increases.

EXAMPLE 13

Two systems were made from the components listed in Table 7 in the indicated quantities. System XIX shows the result of incorporating the optimum prepolymers with the optimum homogeneous polyol system. A wide molding parameter is possible with minimized

TABLE 6

| | SYSTEM | | |
|---|---|---|---|
| | XV | XVI | XVII |
| POLYOL A | 30 | 30 | 30 |
| POLYOL B | 35 | 35 | 35 |
| POLYOL C | 15 | 15 | 15 |
| EG | 20 | 20 | 20 |
| KCl | 0.5 | 0.5 | 0.5 |
| PC8 | 0.2 | — | — |
| 33LV | — | 0.15 | .15 |
| DB | — | 1.5 | 1.5 |
| POLYISOCYANATE B | — | — | 113 |
| POLYISOCYANATE A | 113 | — | 113 |
| PREPOLYMER D | — | 130 | — |
| INDEX | 105 | 105 | 105 |

| | SYSTEM | | | |
|---|---|---|---|---|
| | XV A | XV B | XV C | XV D |
| DENSITY (pcf) | 73.3 | 73.3 | 74.2 | 73.9 |
| HDT @ 66 psi (°C.) | 52.2 | 62.0 | 72.6 | 83.6 |
| IZOD (ft-lb/in) | 0.87 | 0.96 | 1.44 | 1.72 |
| FLEX MODULUS (psi) | 296,000 | 284,000 | 243,505 | 200,980 |
| FLEX STRENGTH (psi) | 11,159 | 10,934 | 9,432 | 8,205 |
| TENS. STRENGTH (psi) | 8,212 | 7,012 | 6,037 | 5,100 |
| GEL TIME (sec) | 48 | 48 | 48 | 48 |
| MOLD TEMPERATURE (°F.) | 50 | 70 | 100 | 130 |
| DEMOLD TIME (min) | 4 | 4 | 4 | 4 |

| | SYSTEM | | |
|---|---|---|---|
| | XVI A | XVI B | XVI C |
| DENSITY (pcf) | 73.4 | 73.2 | 73.3 |
| HDT @ 66 psi (°C.) | 61.2 | 70.6 | 69.4 |
| IZOD (ft-lb/in) | 1.91 | 2.08 | 2.19 |
| FLEX MODULUS (psi) | 198,000 | 178,000 | 162,500 |
| FLEX STRENGTH (psi) | 7,689 | 6,916 | 7,082 |
| TENS. STRENGTH (psi) | 5,260 | 4,743 | 4,850 |
| GEL TIME (sec) | 28 | 28 | 28 |
| MOLD TEMPERATURE (°F.) | 50 | 70 | 80 |
| DEMOLD TIME (min) | 4 | 4 | 4 |

| | SYSTEM | | |
|---|---|---|---|
| | XVII A | XVII B | XVII C |
| DENSITY (pcf) | 70.1 | 70.5 | 70.7 |
| HDT @ 66 psi (°C.) | 85.7 | 83.2 | 86.0 |
| IZOD (ft-lb/in) | 0.95 | 1.14 | 1.83 |
| FLEX MODULUS (psi) | 250,000 | 248,900 | 215,200 |
| FLEX STRENGTH (psi) | 9,930 | 9,820 | 9,070 |
| TENS. STRENGTH (psi) | 5,289 | 5,432 | 5,398 |
| GEL TIME (sec) | 41 | 41 | 41 |
| MOLD TEMPERATURE (°F.) | 70 | 90 | 130 |
| DEMOLD TIME (min) | 4 | 4 | 4 |
| SHEAR STRENGTH (psi) | 151 | 164 | 173 | changes in impact properties or brittleness to the system. The urethane shows adhesion strength to the aluminum substrate used in this analysis.

TABLE 7

| | SYSTEM | | | |
|---|---|---|---|---|
| | XVIII | XIX | XX | XXI |
| Polyol A (pbw) | 30 | 30 | 30 | 30 |
| Polyol B (pbw) | 35 | 35 | 35 | 35 |
| Polyol C (pbw) | 15 | 7 | 7 | 7 |
| Polyol D (pbw) | — | 8 | 8 | 8 |
| EG (pbw) | 19.5 | 20 | 20 | 20 |
| KCl (pbw) | 0.5 | 0.5 | 0.5 | 0.5 |
| DB (pbw) | — | 1.5 | 1.5 | 1.5 |
| 33LV (pbw) | — | 0.15 | 0.15 | 0.15 |

TABLE 7-continued

| | SYSTEM | | | |
|---|---|---|---|---|
| | XVIII | XIX | XX | XXI |
| PC8 (pbw) | 0.2 | — | — | — |
| Polyisocyanate B (pbw) | 115 | — | — | — |
| Prepolymer A (pbw) | — | 123 | 123 | 123 |
| Index | 105 | 105 | 105 | 105 |
| Gel Time (sec.) | 33 | 36 | 36 | 36 |
| Mold Temp (°F.) | 90 | 90 | 70 | 50 |
| Density (pcf) | 72.0 | 73.0 | 73.4 | 72.6 |
| Flexural modulus (psi) | 201,000 | 191,138 | 221,000 | 232,465 |
| Flexural strength (psi) | 8839 | 7665.5 | 8823 | 9114 |
| Tensile Strength (psi) | 6075 | 5069 | 5351 | 5453 |
| Elongation % | 12 | 70 | 40 | 15 |
| HDT @ 66 psi (°C.) | 100.5 | 80.3 | 78.1 | 70.8 |
| IZOD (ft-lb/in) | 1.61 | 2.27 | 2.28 | 2.19 |
| Shear Strength (psi) | 548 | 263 | — | — |

EXAMPLE 14 (based on U.S. Pat. No. 4,575,518)

Solutions of various salts in ethylene glycol were made by heating a mixture of the indicated salt and the indicated amount of ethylene glycol to 43° C. and mixing for the time given in Table 8. The resultant mixtures were then combined with the indicated polyols in the indicated amounts. The phase stability of each of the resultant polyol components is indicated in Table 8.

TABLE 8

| | System | | | | |
|---|---|---|---|---|---|
| | XXII | XXIII | XXIV | XXV | XXVI |
| Salt Solution | J | L | M | N | O |
| Polyol A (pbw) | 30 | 30 | 30 | 30 | 30 |
| Polyol B (pbw) | 35 | 35 | 35 | 35 | 35 |
| Polyol C (pbw) | 7 | 7 | 7 | 7 | 7 |
| Polyol D (pbw) | 8 | 8 | 8 | 8 | 8 |
| EG (pbw) | 20 | 20 | 20 | 20 | 20 |
| CaCl$_2$ (pbw) | 0.5 | — | — | — | — |
| NaCl (pbw) | — | 0.5 | — | — | — |
| NaBr (pbw) | — | — | 0.5 | — | — |
| Dabco-DCl (pbw) | — | — | — | 0.5 | — |
| Dabco-WT (pbw) | — | — | — | — | 0.5 |
| Temp (°C.) | 43 | 43 | 43 | 43 | 43 |
| Mixing Time (min) | 30 | 45 | 90 | 45 | 45 |
| Phase stability after 24 hours | | | NONE | | |

EXAMPLES 15–19

Each of the systems described in Table 8 was reacted with Polyisocyanate B at a mix ratio of 108 parts by weight of isocyanate to 100 parts by weight of polyol blend. The reaction mixture was poured into a mold at a temperature of 70° F. and allowed to set for 4 minutes. The resultant urethane samples were prepared for shear strength analysis and Notched Izod Impact testing. The results of these tests are summarized in Table 9.

TABLE 9

| | SYSTEM | | | | |
|---|---|---|---|---|---|
| | XXVII | XXVIII | XXIX | XXX | XXXI |
| Shear Strength (psi) | 230 | 152 | 156 | 219 | 211 |
| Izod (ft-lb/in) | 1.02 | 0.98 | 1.01 | 0.97 | 0.88 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a thermal break polyurethane having improved shrinkage and adhesion characteristics comprising:
   (a) combining
       (1) a polyoxyalkylene polyol, polyolamine, or polyamine based on a alkyloxirane and having a molecular weight of from 400 to 12,000,
       (2) 1–35 parts by weight of a polyol having at least two hydroxyl groups and a molecular weight of from 62 to 399 and
       (3) 0.05–33.3 parts by weight potassium halide
   in quantities such that the total parts by weight is approximately 100 parts by weight in a manner such that the functionality of the mixtures is at least 2.0
   with a substantially stoichiometric amount of
       (4) a diphenylmethane diisocyanate, a modified dipheylmethane diisocyanate or an NCO prepolymer formed from diphenylmethane diisocyanate and
   (b) applying the resultant mixture to a substrate.

2. The process of claim 1 in which (a)(3) is potassium chloride.

3. The process of claim 1 in which (a)(3) is potassium bromide.

4. The process of claim 1 in which the substrate is a prepolymer.

5. The process of claim 1 in which the substrate is aluminum.

6. The product of the process of claim 1.

7. The product of the process of claim 3.

8. The product of the process of claim 4.

9. The product of the process of claim 5.

10. A stable mixture of polyols, polyolamines and/or polyamines suitable for the production of thermal break urethanes comprising
   (1) a polyoxyalkylene polyol, polyolamine or polyamine based on an alkyloxirane having a functionality of at least 2.5 and a molecular weight of from 400 to 12,000,
   (2) 5 parts by weight of a polyol having at least two hydroxyl groups and a molecular weight of from 62 to 399 and
   (3) a potassium halide
which mixture has an overall functionality of at least 2.

* * * * *